United States Patent Office 3,419,863
Patented Dec. 31, 1968

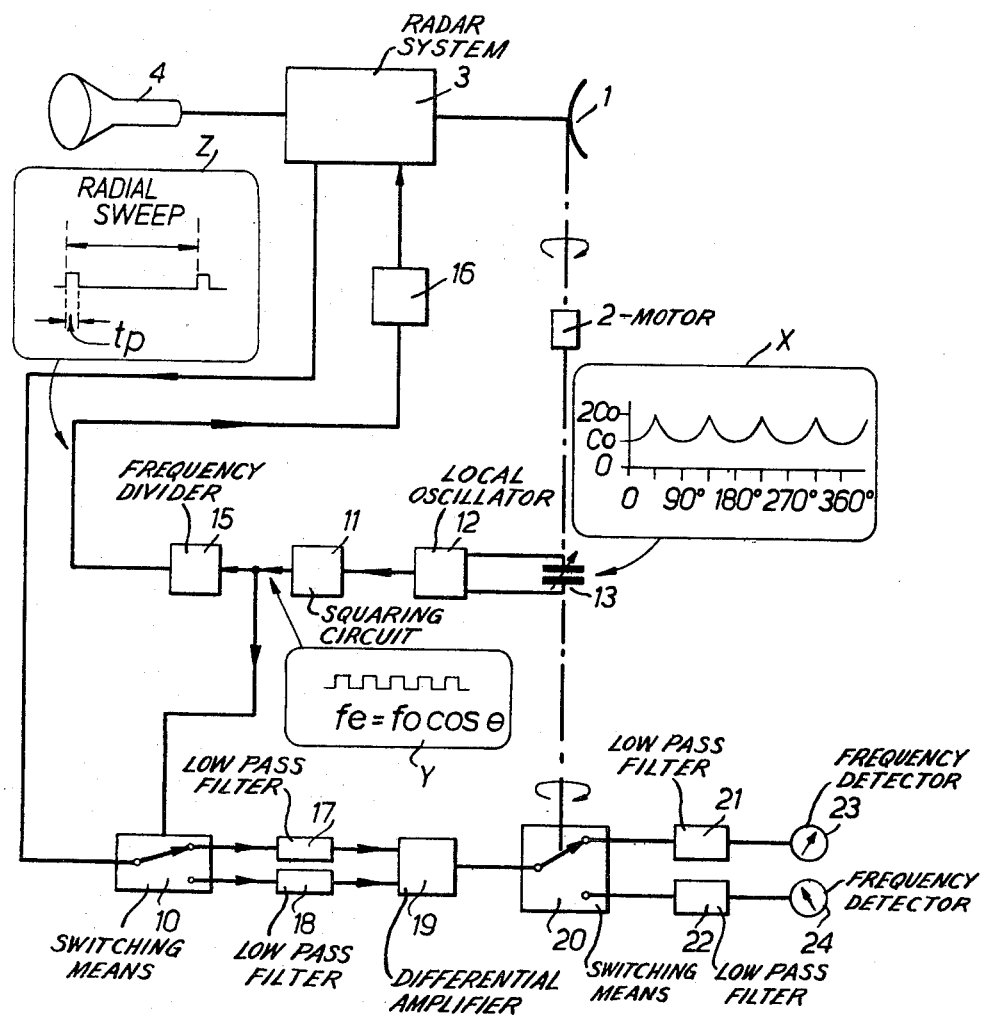

3,419,863
SPEED MEASURING APPARATUS
John Henry Reginald Lewis, Theydon Bois, Essex, England, assignor to The Marconi Company Limited, London, England, a British company
Filed Aug. 21, 1967, Ser. No. 661,966
Claims priority, application Great Britain, Aug. 23, 1966, 37,840/66
8 Claims. (Cl. 343—8)

ABSTRACT OF THE DISCLOSURE

A radar for a vehicle in which video signals are branched off and blanked or gated at a frequency which is substantially constant with relation to an individual radial scan of the P.P.I. but which is varied as a function of the angular deflection of the scan from a datum. The gated video signal, which will contain a major frequency component signal proportional to the speed of the vehicle in the datum direction, is passed through a low pass filter to remove the gating frequency and thence to a frequency meter which will produce an output corresponding to the major component of frequency and thus corresponding to the speed of the vehicle in said datum direction.

In the described embodiment the video signals are gated alternately between two paths both feeding a differential amplifier and each having an individual low pass filter whereby the output corresponding to said major frequency component signal is amplified but noise and disturbing signals generated in the receiver are substantially cancelled. A further switch may be provided to enable the datum direction to be varied.

---

This invention relates to speed measuring apparatus and has for its object to provide improved and simple apparatus whereby the speed, in one or more predetermined component directions, of a pulsed radar relative to an area or target "seen" thereby, may be readily ascertained. In particular the present invention seeks to provide relatively simple and inexpensive apparatus which, when added to an ordinary pulsed radar which does not include speed measuring equipment, will enable that radar to be used, when desired, for speed measurement. Many aircraft at present in service carry P.P.I. display radars for general navigation aiding purposes but such radars do not ordinarily include speed measuring equipment. In those cases in which an aircraft carries equipment for measuring ground speed such equipment usually takes the form of a Doppler radar provided for that purpose. Doppler radars are expensive and complex and, obviously, it is very desirable to enable an ordinary radar to be adapted, when required, to give speed readings.

The invention described in the specification accompanying the inventor's copending United States Patent Application Ser. No. 661,967 achieves the foregoing object but does so by deriving the required speed information—more precisely direction speed information—from the movements of the P.P.I. display of the radar across the display tube thereof. The present invention seeks to attain the same object but to derive the required component speed information directly from the radar video signals and without interfering in any way with the display itself.

As explained in the aforementioned copending United States patent application above mentioned the speed of movement, in one or more predetermined chosen directions, of a radar P.P.I. display over the screen of the display tube can be used to give important and valuable information. Thus, for example, in the case of an air-borne radar providing a P.P.I. display of an area of the ground, the display will of course give the slant ranges of the different targets included therein. These slant ranges will change as the aircraft moves over the ground, the display having one component direction of movement due to forward movement of the aircraft and a perpendicular component direction of movement due to sideways movement (drift) of the aircraft. In the case of targets which are far enough away for the differences between slant ranges and true horizontal ranges to be neglected, measurement of the speed of movement of the display in one component direction will give (sufficiently closely for practical purposes) the forward speed of the aircraft and measurement of the speed of movement of the display in the other component direction will similarly give (nearly enough) the drift speed. Even if the differences between slant ranges and true horizontal ranges are too great to be neglected, aircraft forward and drift speeds can be derived from measurement of the speeds of the appropriate component directions of movement of the display by applying compensating corrections, which will be apparent to those skilled in the art to the measured speeds. The invention in the said copending application enables component direction speeds of movement of a P.P.I. display to be obtained from that display: the present invention enables said component direction speeds of movement to be obtained, without interfering with the display, from the radar video signals from which the display is constituted.

According to this invention a pulsed radar adapted to provide a P.P.I. display comprises means for branching off radar video signals obtained by the radar; means for gating or blanking off the branched off radar signals during substantially radial P.P.I. deflections at a frequency which is substantially constant during each such deflection but is varied automatically as a function of variation of the substantially radial deflection direction during required arcs of azimuth, low pass filter means having a low cut-off frequency well below the gating or blanking off frequency; and frequency responsive means responsive to a major component of frequency which will be present in the signals passed by the low pass filter means and will be representative of relative speed in a predetermined component direction.

Preferably the gating or blanking off during said arcs is effected by a square wave gating or blanking signal of the form $f_\theta = f_0 \cos \theta$ where $\theta$ is the angle, with reference to a datum radial directive, of the radial deflection and $f_0$ is the gating or blanking frequency applied during deflection in said datum direction. The datum direction will be in one direction for the case in which speed in the ahead drection (assuming an airborne radar) is required and in a direction at right angles thereto for the case in which drift speed—i.e., speed in an abeam direction—is required.

Preferably the gating or blanking signal is generated by an oscillator having a frequency determining inductance-capacitance resonant circuit the capacitance of which is variable and is varied automatically by mechanical or electrical ganging with the rotation of the azimuth scanning aerial of the radar. It may be shown that the required law of variation of the capacitance C of the condenser is $C = C_0 (1 + \tan^2 \theta)$ where $\theta$ is the azimuth angle swept out in a predetermined arc of azimuth by the radar aerial from a datum azimuth direction and $C_0$ is the value of the capacitance corresponding to datum direction. It may also be shown that, if $\theta$ has a maximum value of $\pm 45°$ the maximum capacitance required is $2C_0$, the capacitance change being $C_0$.

As will be appreciated the gating or blanking frequency $f_0$ causes the production of a major frequency component which is dependent on speed in the chosen component direction and it is this frequency component which, after feeding through a low pass filter to remove the gating or blanking frequency, is measured in frequency to ascertain speed. The low pass filter should have a low upper cut off frequency chosen as far below $f_0$ as is consistent with comfortably passing a frequency equal to twice the radar aerial rotation speed in revolutions per second or the speed-dependent frequency $f_v$, whichever is the greater. The speed-dependent frequency $f_v$ corresponding to a given speed $v$ depends on the value of $f_0$ and is given by the relation $$f_v/f_0 = 2v/C$$

where $c$ is the speed of propagation of electro-magnetic waves in space. If, therefore, the radar is carried by an aircraft with a forward speed of 300 knots, $f_v/f_0 = 10^{-6}$. In practice $f_0$ is chosen at as high a value as practical in order that $f_v$ may be of a value which is convenient to measure.

It may also be shown that optimum signal/noise ratio is obtained when the average duration of a radar echo signal is equal to a half cycle of the frequency $f_0$. The minimum duration of an echo may be taken as equal to the duration $t_p$ of a transmitted pulse. Accordingly best results, as respects choice of $f_0$, are obtained by making $$f_0 = 1/2t_p$$

The start of the radar radial scan must be phase locked with the generated frequency $f_0 \cos \theta$ and this requirement is best satisfied by triggering the radar pulse transmitter to transmit pulses under the control of a frequency derived from and related to $f_0 \cos \theta$.

Preferably, in order to provide a stronger signal with reduced noise and interference at the frequency which is measured to ascertain component speed and to reduce the effects of interference noise and D.C., the branched off radar signals are gated by means of a two-way switch device (in practice an electronic switch device) which is driven at the frequency $f_0 \cos \theta$ and which alternately feeds the gated signals to two channels each containing a low pass filter and feeding into the two inputs of a differential amplifier having a single output from which the frequency to be measured is derived. In a preferred arrangement of this nature the output from the differential amplifier is fed alternately by means of a further two-way switch device, to two frequency meters, said further switch device being ganged with the radar aerial rotation so as to change over at each 90° of such rotation, variation of the frequency $f_0$ being also ganged with radar aerial rotation so as to be varied from its maximum to its minimum value and back again during each 90° in which said further switch is in one position. Thus, where $f_\theta$ is obtained from a swept oscillator having a frequency determining parallel resonant circuit including a condenser having a variable capacitance C satisfying the law $C = C_0 (1 + \tan^2\theta)$, said condenser is ganged with radar aerial rotation and falls from $2C_0$ to $C_0$ and rises again to $2C_0$ during each such 90°. In an arrangement employing a further switch device as above described, one frequency meter will (if the correct phase relation of variation of $f_q$, rotation of radar aerial, and actuation of the further switch is obtained) read forward speed and the other will read drift speed. Preferably the meters are fed from the further switch device through additional low pass filters or equivalent means (e.g., Schmitt trigger devices) adapted and arranged to pass the appropriate speed-dependent frequency but not the disturbing frequency due to the operation of the further switch.

It will now be appreciated that apparatus in accordance with this invention in effect integrates all radar echoes to provide a frequency representative of average velocity of movement. In the case of an airborne radar, aircraft speed (and/or drift) is thus obtainable. In the case of a ground radar there may be a number of targets moving at different speeds in the display and the average speed obtained as described may therefore not indicate anything useful. However, the invention may be usefully applied even in the case of a ground radar by providing a gating "strobe" to be placed round a particular echo in manner known per se under the control of a human operator) and the invention used to measure the speed of that echo, the measurement being used, if required, to control the radar to "track" the chosen strobed echo.

Incidentally it should be noted that, in embodiments using a differential amplifier fed with oppositely gated radar video signals through two channels, D.C. signals due to echoes from the fixed targets will be eliminated in the differential amplifier, and therefore the speeds of moving targets only will be obtained.

Speed measuring radars, usually Doppler radars, are, of course, well known. They are, however, expensive. Nowadays many aircraft are already equipped with navigation aiding radars having P.P.I. displays for "watching" the terrain over which the aircraft if flying. An important practical advantage of the invention is that it enables such a radar, which does not normally incorporate speed measuring equipment, to be modified by the addition of comparatively simple and cheap apparatus which enables it to be used, when required, for speed measurement.

The invention is illustrated in the accompanying drawing which shows, in block diagram form with explanatory graphical inserts, a preferred embodiment measuring both forward speed and drift speed of an airborne pulsed radar.

Referring to the drawing the transmitting-receiving directional aerial 1 of a pulsed radar is continuously rotated in azimuth by an electric motor 2. It receives pulses for transmission and supplies received echo pulses to a radar equipment represented by the block 3. The radar equipment operates a P.P.I. display tube 4. As so far described the apparatus is a normal pulse radar with a P.P.I. display. It is, of course, shown in much simplified schematic manner. Radar video signals obtained in the equipment 3 are branched off and fed to an electronic switch 10 constituted by any convenient form of electronic two-way switch, by means of which the said video signals are gated or blanked off. This switch 10 is actuated by a square wave form of frequency $f_0 \cos \theta$ obtained from a squaring circuit 11 connected to square the oscillations from a local oscillator 12. This oscillator has a parallel tuned circuit as its frequency determining circuit and the condenser 13 thereof is a variable condenser having a capacitance ratio (maximum to minimum) of 2:1. Its variation is mechanically or electrically ganged with the azimuth rotation of the aerial 1. The condenser 13 is of such value that when the aerial 1 is "looking" directly ahead, the frequency of the oscillator 12 is $f_0$. The law of variation of the capacitance C of the condenser 13 is:

$$C = C_0(1 + \tan^2 \theta)$$

where $\theta$ is the angle through which the aerial has turned from the ahead direction in a predetermined arc of azimuth. The variation of C with aerial azimuth is shown conventionally in the "balloon" X in which 0° is the ahead direction and, as will be seen, the condenser is varied in capacitance between the values $C_0$ and $2C_0$. The frequency from the generator 12 is therefore $f_0 = f_0 \cos \theta =$ (in the ahead direction and in directions at 90° and 180° thereto) $f_0$. The varying frequency square wave from 11 operates the switch 10 which gates or blanks off the branched off radar video signals and supplies them, oppositely gated, through low pass filters 17, 18 to the two inputs of a differential amplifier 19. The square wave form from 11 is indicated in the "balloon" Y. To quote a practical figure $f_0$ might be of the order of 1 mc./s. In such a case the filters 17, 18 would have an upper cut-off frequency well below 1 mc./s. and as low as practical consistent with passing a frequency equal to the aerial rotation speed in revolutions per second, or $f_v$ whichever is the greater.

In order to obtain accurate phase locking between the generated frequency $f_0 \cos \theta$ and the start of the radar radial scan, the radar pulse transmission is triggered from $f_0 \cos \theta$. In the figure this is done by feeding output from the squarer 11 to a counter or other frequency divider 15 the divided output from which triggers by means of a trigger circuit 16 the pulse transmitter included in the equipment 3 and also, of course, the start of each radial scan. To quote practical figure if $f_0$ is of the order of 1 mc./s. the division ratio of 15 might be 1000. "Balloon" Z shows conventionally one radial sweep or scan and the transmitted pulse of width $t_p$.

The output from the differential amplifier 19 is fed, via a further two-way switch 20, alternately to two further low pass filters 21, 22 each feeding into a frequency meter—in practice of the counter type—23 or 24. One of these meters will read forward speed and the other abeam drift speed and they may be calibrated directly in terms of speeds. Instead of, or as well as, being used merely to indicate speeds, the outputs from 21 and 22 may be utilised by any convenient desired frequency responsive means (not shown) for example to operate a radar target tracker (not shown) in manner known per se. The further switch 20 is arranged (by means not shown) to change position at each 90° of aerial rotation i.e. at 45°, 135°, 225° and 315°. The filters 21 and 22 are designed to pass the speed-representative frequencies but not the switching frequency due to the switch 20. If, by reason of the actual frequencies occurring, it is not convenient to use actual low pass filter networks for the filters 21 and 22 the said filters may be constituted by suitably operated Schmitt trigger circuits to eliminate the undesired switching frequency due to switch 20. For the purposes of the present invention such trigger circuits may be regarded as filters.

It will be seen that the radar proper (comprised of the parts 1, 2, 3 and 4) is (except for the arrangement for triggering off the transmitted radar pulses), an ordinary pulsed P.P.I. radar such as might well be already provided—for example in an aircraft—for other purposes and that the added apparatus provided in order to enable the same radar to be used for speed and/or drift determination is of a simple and inexpensive nature costing far less than a Doppler radar would do.

The specification accompanying the aforementioned copending United States patent application Ser. No. 661,967 describes a speed measuring apparatus which is in many respects similar to those described herein. The invention in the two specifications are however distinct from one another in that, in the present specification, speed information is derived directly from the radar video signals without interfering in any way with the P.P.I. display.

I claim:

1. A pulsed radar adapted to provide a P.P.I. display and comprising means for branching off radar video signals obtained by the radar; means for gating or blanking off the branched off radar signals during substantially radial P.P.I. deflections at a frequency which is substantially constant during each such deflection but is varied automatically as a function of variation of the substantially radial deflection direction during required arcs of azimuth; low pass filter means having a low cut-off frequency well below the gating or blanking off frequency; and frequency responsive means responsive to a major component of frequency which will be present in the signals passed by the low pass filter means and will be representative of relative speed in a predetermined component direction.

2. A radar as claimed in claim 1 wherein said means for gating or blanking off during said arcs includes means for providing a square wave gating or blanking signal of the form $f_\theta = f_0 \cos \theta$ where $\theta$ is the angle, with reference to a datum radial directive, of the radial deflection and $f_0$ is the gating or blanking frequency applied during deflection in said datum direction.

3. A radar as claimed in claim 2 wherein said means for providing a square wave gating or blanking signal includes an oscillator having a frequency determining inductance-capacitance resonant circuit the capacitance of which is variable, said radar including an azimuth scanning aerial, the rotation of the azimuth scanning aerial of the radar being ganged with said variable capacitance for automatically varying said capacitance.

4. A radar as claimed in claim 3 wherein the gating or blanking frequency $f_0$ provided by said oscillator and the duration $t_p$ of the transmitted radar pulse provided by said radar substantially satisfy the equation $f_0 = \frac{1}{2} t_p$.

5. A radar as claimed in claim 4 including means for phase locking the start of the radial scan with said oscillator generating the gating or blanking off signal by triggering the radar pulse transmitter to transmit pulses under the control of a frequency derived from said oscillator and related to the frequency thereof.

6. A radar as claimed in claim 5 including gating means for gating the branched off radar signals comprising a two-way switch means for switching at the frequency $f_0 \cos \theta$, two channels each including a low pass filter, said switch means alternately feeding the gated signals therefrom to the two channels, a differential amplifier having two inputs, said two channels feeding into the two inputs of said differential amplifier, said differential amplifier having a single output providing the frequency to be measured.

7. A radar as claimed in claim 6 including a further two-way switch means and two frequency meters, the output from the differential amplifier being fed alternately by means of said further two-way switch means, to said two frequency meters, said further switch means being ganged with the radar aerial rotation so as to change over at each 90° of such rotation, variation of said capacitance ganged with radar aerial rotation varying the frequency $f_\theta$ from its maximum to its minimum value and back again during each 90° in which said further switch is in one position.

8. A radar as claimed in claim 7 including means, intermediate said meters and further switch device, for passing the appropriate speed-dependent frequency but not the disturbing frequency due to the operation of the further switch.

References Cited

UNITED STATES PATENTS 3,174,147    3/1965    Vosburgh et al. _____ 343—9 X

RODNEY D. BENNETT, *Primary Examiner.*

C. L. WHITHAM, *Assistant Examiner.*

U.S. Cl. X.R.

343—9